US010895466B2

(12) United States Patent
Matsumoto (10) Patent No.: US 10,895,466 B2
(45) Date of Patent: Jan. 19, 2021

(54) INFORMATION PROVIDING APPARATUS, SERVER, INFORMATION PROVIDING METHOD

(71) Applicant: CLARION CO., LTD., Saitama (JP)

(72) Inventor: Yusuke Matsumoto, Saitama (JP)

(73) Assignee: CLARION CO., LTD., Saitama (JP)

( * ) Notice: Subject to any disclaimer, the term of this patent is extended or adjusted under 35 U.S.C. 154(b) by 315 days.

(21) Appl. No.: 15/939,938

(22) Filed: Mar. 29, 2018

(65) Prior Publication Data

US 2018/0313659 A1 Nov. 1, 2018

(30) Foreign Application Priority Data

Apr. 28, 2017 (JP) .................................. 2017-089274

(51) Int. Cl.
*G01C 21/36* (2006.01)
(52) U.S. Cl.
CPC ..... *G01C 21/3617* (2013.01); *G01C 21/3647* (2013.01); *G01C 21/3682* (2013.01); *G01C 21/3691* (2013.01); *G01C 21/3697* (2013.01)
(58) Field of Classification Search
CPC ............ G01C 21/3617; G01C 21/3682; G01C 21/3691; G01C 21/3647; G01C 21/3697
See application file for complete search history.

(56) References Cited

U.S. PATENT DOCUMENTS

| 9,245,040 B2* | 1/2016 | Currie | G06F 16/9537 |
|---|---|---|---|
| 2002/0091879 A1* | 7/2002 | Beriker | G06F 16/951 |
| | | | 710/1 |
| 2003/0227392 A1* | 12/2003 | Ebert | H04L 67/12 |
| | | | 340/8.1 |
| 2005/0108213 A1* | 5/2005 | Riise | G06F 16/9537 |
| 2008/0312817 A1* | 12/2008 | Kawauchi | G08G 1/096888 |
| | | | 701/533 |
| 2009/0030599 A1* | 1/2009 | Kawauchi | G01C 21/3611 |
| | | | 701/532 |
| 2009/0306989 A1* | 12/2009 | Kaji | G10L 15/22 |
| | | | 704/270 |

(Continued)

FOREIGN PATENT DOCUMENTS

JP 2006-301799 A 11/2006

OTHER PUBLICATIONS

Extended European Search Report issued for corresponding European Patent Application No. 18166467.3-1003 dated Oct. 9, 2018.

*Primary Examiner* — Sze-Hon Kong
(74) *Attorney, Agent, or Firm* — IP Business Solutions, LLC (57) ABSTRACT

An external information saving unit sets a reference word related to a situation of a change element at reception of external information and associates and saves the external information and the reference word in an information DB. An external information extraction unit extracts a search word from search information input by a user and extracts the external information associated with the reference word, in which a matching rate with the search word is equal to or greater than a predetermined level, from the external information saved in the information DB. An extracted information output unit displays the external information extracted by the external information extraction unit on a display.

12 Claims, 10 Drawing Sheets

(56) References Cited

U.S. PATENT DOCUMENTS

| | | | |
|---|---|---|---|
| 2010/0069035 A1* | 3/2010 | Johnson | H04W 92/18 455/404.1 |
| 2010/0146546 A1* | 6/2010 | Nishimura | H04H 60/53 725/39 |
| 2011/0010376 A1* | 1/2011 | Kawauchi | G01C 21/36 707/758 |
| 2011/0055185 A1* | 3/2011 | Bitan | G06F 16/951 707/706 |
| 2011/0179040 A1* | 7/2011 | Bessonov | G06F 16/955 707/747 |
| 2011/0225163 A1* | 9/2011 | Lyon | G06F 16/93 707/740 |
| 2012/0022788 A1 | 1/2012 | Yamamoto | |
| 2012/0143598 A1* | 6/2012 | Bandara | G06F 40/242 704/10 |
| 2012/0158289 A1* | 6/2012 | Bernheim Brush | G06F 16/248 701/425 |
| 2013/0321466 A1 | 12/2013 | Kocienda | |
| 2013/0344899 A1* | 12/2013 | Stamm | G06Q 10/109 455/456.3 |
| 2014/0278051 A1* | 9/2014 | McGavran | G06N 20/00 701/400 |
| 2014/0280174 A1* | 9/2014 | Bitan | G06F 16/904 707/740 |
| 2014/0372904 A1 | 12/2014 | Liu et al. | |
| 2015/0120300 A1 | 4/2015 | Maruta | |
| 2015/0356136 A1* | 12/2015 | Joshi | G06F 16/245 707/736 |
| 2017/0048664 A1* | 2/2017 | Zhang | H04L 67/22 |
| 2018/0286205 A1* | 10/2018 | Batra | G08B 25/10 |

* cited by examiner

| TYPE OF CHANGE ELEMENT | ASSOCIATED INFORMATION | |
|---|---|---|
| | SITUATION OF CHANGE ELEMENT | REFERENCE WORD |
| 1. ORIGIN, TRANSIT POINT, AND DESTINATION | NAMES OF PREFECTURES AND CITIES OF ORIGIN, TRANSIT POINT, AND DESTINATION AND POI OF DESTINATION | NAMES OF ORIGIN, TRANSIT POINT, AND DESTINATION IN WHICH THE NUMBER OF TIMES SET IS SMALL |
| 2. WEATHER | INFORMATION ON WEATHER SUCH AS SUNNY, CLOUDY, RAIN, AND SNOW | MORE DETAILED NAME OF NATURAL PHENOMENON SUCH AS HEAVY RAIN, LIGHTNING, STRONG WIND, HEAVY SNOW AND EARTHQUAKE |
| 3. DATE OF TODAY | INFORMATION SUCH AS YEAR Y, MONTH M, MONTH M AND DAY D | NAME OF SPECIFIC DAY SUCH AS NATIONAL HOLIDAY, BIRTHDAY, AND ANNIVERSARY |
| 4. CURRENT TIME | INFORMATION SUCH AS MORNING, NOON, DAYTIME, EVENING, NIGHT, AND HOUR H AND MINUTE M | NAME OF ROUNDED HOUR SUCH AS H O'CLOCK |
| 5. CURRENT POSITION | LATITUDE AND LONGITUDE | NAME OF FACILITY, NATURAL OBJECT, INTERSECTION, OR THE LIKE NEAR CURRENT POSITION |

D2

| TYPE OF CHANGE ELEMENT | ASSOCIATED INFORMATION | |
|---|---|---|
| | SITUATION OF CHANGE ELEMENT | REFERENCE WORD |
| 1. ORIGIN, TRANSIT POINT, AND DESTINATION | NOT SET | NONE |
| 2. WEATHER | SUNNY | NONE |
| 3. DATE | JULY 18, 2016, MONDAY | MARINE DAY |
| 4. TIME | DAYTIME 9:42 | NONE |
| 5. CURRENT POSITION | 35.713652 NORTH, 139.804408 EAST | TOKYO SKYTREE |

INFORMATION PROVIDING APPARATUS, SERVER, INFORMATION PROVIDING METHOD

INCORPORATION BY REFERENCE

The present application claims priority under 35 U.S.C. § 119 to Japanese Patent Application No. 2017-089274 filed on Apr. 28, 2017. The content of the application is incorporated herein by reference in its entirety.

BACKGROUND OF THE INVENTION

Field of the Invention

The present invention relates to an information providing apparatus, a server, and an information providing method.

Description of the Related Art

A vehicle information providing system is described in Japanese Patent Laid-Open No. 2006-301799, in which a user asks an operator of an information center for desired information, and the operator transmits searched information from the information center to a vehicle-mounted device. In the vehicle information providing system described in Japanese Patent Laid-Open No. 2006-301799, an operation history of operation of the vehicle-mounted device by the user and data of results of information search performed by the user are saved in a history saving unit of the vehicle-mounted device. The vehicle-mounted device transmits the data saved in the history saving unit to the information center when the vehicle-mounted device issues an information request to the information center 20.

The operator of the information center can refer to the operation history and the results of information search by the user received from the vehicle-mounted device to efficiently search the information.

An information providing apparatus having a function of receiving and outputting, on an as needed basis, external information transmitted from a broadcast station, an information providing server, or the like is also known as an information providing apparatus used in a moving body such as a vehicle. It is difficult for the user riding on the moving body to view all of the external information at the reception of the external information. Therefore, there can be a demand for a utility form in the information providing apparatus, in which the received external information is saved in a storage unit, and then the external information saved in the storage unit is output at a timing requested by the user.

To handle such a utility form, the information providing apparatus needs to search for external information requested by the user from the external information saved in the storage unit, and extraction of the external information according to the request by the user is difficult in some cases.

The present invention has been made in view of the circumstances, and an object of the present invention is to provide an information providing apparatus, a server, and an information providing method that can easily extract external information according to a request by a user from external information received in the past and saved in a storage unit.

SUMMARY OF THE INVENTION

To attain the object, an embodiment of the present invention provides an information providing apparatus used in a moving body, the information providing apparatus comprising: an information reception unit that receives external information; a situation recognition unit that recognizes a situation of a predetermined change element; an information output unit that outputs information; an external information saving unit that sets a reference word related to the situation of the change element and that associates and saves the received external information and the set reference word in an information storage unit after the recognition of the situation of the change element by the situation recognition unit at the reception of the external information when the information reception unit receives the external information; a search reception unit that receives input of search information by a user; an external information extraction unit that extracts a search word from the search information and that extracts the external information associated with the reference word, in which a matching rate with the search word is equal to or greater than a predetermined level, from the external information saved in the information storage unit when the search reception unit receives the input of the search information by the user; and an extracted information output unit that outputs the external information extracted by the external information extraction unit from the information output unit.

The information providing apparatus may further include: a route setting unit that sets a route of the moving body from an origin to a destination; and a route history saving unit that saves a past history of routes set by the route setting unit in a route history storage unit, wherein the change element may be an origin, a transit point, or a destination in a route set by the route setting unit, the situation recognition unit may recognize the origin, the transit point, or the destination, and the external information saving unit may set, as the reference word, a name of a spot, in which the number of times set in the past by the route setting unit is smaller than a predetermined number of times, when the external information saving unit recognizes the spot among the origin, the transit point, and the destination recognized by the situation recognition unit from the history of routes saved in the route history storage unit.

In the information providing apparatus, the change element may be a current position of the moving body, the situation recognition unit may recognize the current position of the moving body, and the external information saving unit may set, as the reference word, a name of the current position of the moving body recognized by the situation recognition unit or a name of a facility or a natural object within a predetermined distance from the current position.

In the information providing apparatus, the external information saving unit may change setting of the predetermined distance according to the facility or the natural object.

In the information providing apparatus, the change element may be weather of a region of a location of the moving body, the situation recognition unit may recognize weather information on the region, and the external information saving unit may set a name of a specific natural phenomenon as the reference word when the weather information recognized by the situation recognition unit includes the specific natural phenomenon.

In the information providing apparatus, the change element may be month and day of a current date, the situation recognition unit may recognize the month and day of the current date, and the external information saving unit may set a name of a specific day as the reference word when the month and day of the current date recognized by the situation recognition unit is the specific day.

In the information providing apparatus, the change element may be current time, the situation recognition unit may recognize the current time, and the external information saving unit may set a name of an hour as the reference word when the current time recognized by the situation recognition unit is within a predetermined range before or after the hour.

An embodiment of the present invention provides a server that communicates with an information providing apparatus through a network, the information providing apparatus used in a moving body and configured to receive and output external information, the server including: a reception unit that receives, from the information providing apparatus, acquired information data indicating the external information and indicating a situation of a predetermined change element at the time of the acquisition of the external information; a reference information data generation unit that sets a reference word related to the situation of the change element indicated by the acquired information data and that generates reference information data indicating the external information indicated by the acquired information data and indicating the set reference word; and a transmission unit that transmits the reference information data generated by the reference information data generation unit to the information providing apparatus.

An embodiment of the present invention provides an information providing method including the steps of: an information reception unit receiving external information; a situation recognition unit recognizing a situation of a predetermined change element at the reception of the external information when the information reception unit receives the external information; an external information saving unit setting a reference word related to the situation of the change element recognized by the situation recognition unit and associating and saving the external information and the set reference word in an information storage unit; a search reception unit receiving input of search information by a user; an external information extraction unit extracting a search word from the search information and extracting the external information associated with the reference word, in which a matching rate with the search word is equal to or greater than a predetermined level, from the external information saved in the information storage unit when the search reception unit receives the input of the search information by the user; and an extracted information output unit outputting the external information extracted by the external information extraction unit from an information output unit.

In the information providing method, the change element may include at least one of a current position of the moving body, weather of a region of a location of the moving body, month and day of a current date, and current time.

The information providing method may further include the steps of: a route setting unit setting a route of the moving body from an origin to a destination; and a route history saving unit saving a past history of routes set by the route setting unit in a route history storage unit, wherein the change element may be an origin, a transit point, or a destination in a route set by the route setting unit, the situation recognition unit may recognize the origin, the transit point, or the destination, and the external information saving unit may set, as the reference word, a name of a spot, in which the number of times set in the past by the route setting unit is smaller than a predetermined number of times, when the external information saving unit recognizes the spot among the origin, the transit point, and the destination recognized by the situation recognition unit from the history of routes saved in the route history storage unit.

In the information providing method, the change element may be a current position of the moving body, the situation recognition unit may recognize the current position of the moving body, and the external information saving unit may set, as the reference word, a name of the current position of the moving body recognized by the situation recognition unit or a name of a facility or a natural object within a predetermined distance from the current position.

In the information providing method, the external information saving unit may change setting of the predetermined distance according to the facility or the natural object.

In the information providing method, the change element may be weather of a region of a location of the moving body, the situation recognition unit may recognize weather information on the region, and the external information saving unit may set a name of a specific natural phenomenon as the reference word when the weather information recognized by the situation recognition unit includes the specific natural phenomenon.

In the information providing method, the change element may be month and day of a current date, the situation recognition unit may recognize the month and day of the current date, and the external information saving unit may set a name of a specific day as the reference word when the month and day of the current date recognized by the situation recognition unit is the specific day.

In the information providing method, the change element may be current time, the situation recognition unit may recognize the current time, and the external information saving unit may set a name of an hour as the reference word when the current time recognized by the situation recognition unit is within a predetermined range before or after the hour.

According to the embodiment of the present invention, the reference word related to the situation of the change element at the time of the reception of the external information can be set, and the external information and the reference word can be associated and saved. When the search information is input by the user, the external information can be extracted, the external information being associated with the reference word in which the matching rate with the search word extracted from the search information is equal to or greater than the predetermined level. In this case, the user tends to remember the situation of the change element at the reception of the external information, and it is likely that the reference word related to the situation of the change will be input as a search word. Therefore, the reference word can be used to perform the search to thereby easily extract the external information received in the past.

DETAILED DESCRIPTION OF THE PREFERRED EMBODIMENT

An embodiment of the present invention will be described with reference to FIGS. 1 to 10.

1. Configuration of Information Providing Apparatus and Server

A configuration of an information providing apparatus and a server in the present embodiment will be described with reference to FIG. 1. An information providing apparatus 1 of the present embodiment is configured as part of functions of a vehicle-mounted device (such as a navigation apparatus and an audio apparatus) mounted on a vehicle (equivalent to a moving body of the present invention).

The information providing apparatus 1 includes: a control apparatus 10 that controls overall operation of the information providing apparatus 1; a broadcast tuner 30 that receives broadcast (such as television broadcast, radio broadcast, and teletext broadcast); an external communication unit 31 that communicates with a support server 60 and the like through a communication network 70; a speaker 32 that outputs sound to the interior of the vehicle; a touch panel 33 including a touch switch 33a and a display 33b; a microphone 34 for inputting voice and the like of occupants (mainly, a driver) of the vehicle; a GPS (Global Positioning System) unit 35 that detects a current position of the information providing apparatus 1 (current position, latitude and longitude, of the vehicle); and a storage unit 40 that stores data of information. The storage unit 40 includes an information DB 41 (equivalent to an information storage unit of the present invention), a route history DB 42 (equivalent to a route history storage unit of the present invention), a map DB 43, and a calendar DB 44.

The control apparatus 10 is an electronic circuit unit including a CPU (Central Processing Unit), a memory, various interface circuits, and the like not shown. The CPU executes a control program of the information providing apparatus 1 held in the memory to function as an information reception unit 11, a situation recognition unit 12, an external information saving unit 13, a search reception unit 14, an external information extraction unit 15, an extracted information output unit 16, a route setting unit 17, and a route history saving unit 18. The information reception unit 11, the situation recognition unit 12, the external information saving unit 13, the search reception unit 14, the external information extraction unit 15, and the extracted information output unit 16 execute processes equivalent to the steps of an information providing method of the present invention.

The control apparatus 10 also includes a timing unit 19 that calculates current time and date. Note that a first transmission unit 20 and a first reception unit 21 will be described in [4. Other Embodiments] later.

The support server 60 is a computer system including a CPU, a memory, various interface circuits, and the like not shown.

The information reception unit 11 receives broadcast external information through the broadcast tuner 30 and receives external information (such as news and event information) transmitted from an information transmission server 80 through the external communication unit 31. The situation recognition unit 12 recognizes situations of change elements. In the present embodiment, selected change elements include a current position of the vehicle (current position of the information providing apparatus 1), current date and time, an origin, a stopping point, and a destination of a route set by the route setting unit 17, and weather of a region including the current location of the vehicle.

When the information reception unit 11 receives external information, the external information saving unit 13 sets reference words related to the situations of the change elements at the reception of the external information and associates and saves the external information and the reference words in the information DB 41 included in the storage unit 40. The search reception unit 14 receives input of search information by the user (such as touch operation through the touch switch 33a and voice input through the microphone 34).

The external information extraction unit 15 extracts a search word from the search information received by the search reception unit 14. The external information extraction unit 15 searches and extracts external information associated with the reference words matching the search word from the external information saved in the information DB 41. The extracted information output unit 16 displays the external information extracted by the external information extraction unit 15 on the display 33b.

The route setting unit 17 sets a travel route of the vehicle by referring to map data saved in the map DB 43 of the storage unit 40 according to a route search operation from an origin to a destination through a transit point performed by the user. The route history saving unit 18 saves, in the route history DB 42, information on the origin, the transit point, and the destination in the route set by the route setting unit 17.

2. Saving External Information

A process of saving the external information received by the information reception unit 11 in the information DB 41 in association with the reference words will be described with reference to FIGS. 2 to 8.

Figure 2:
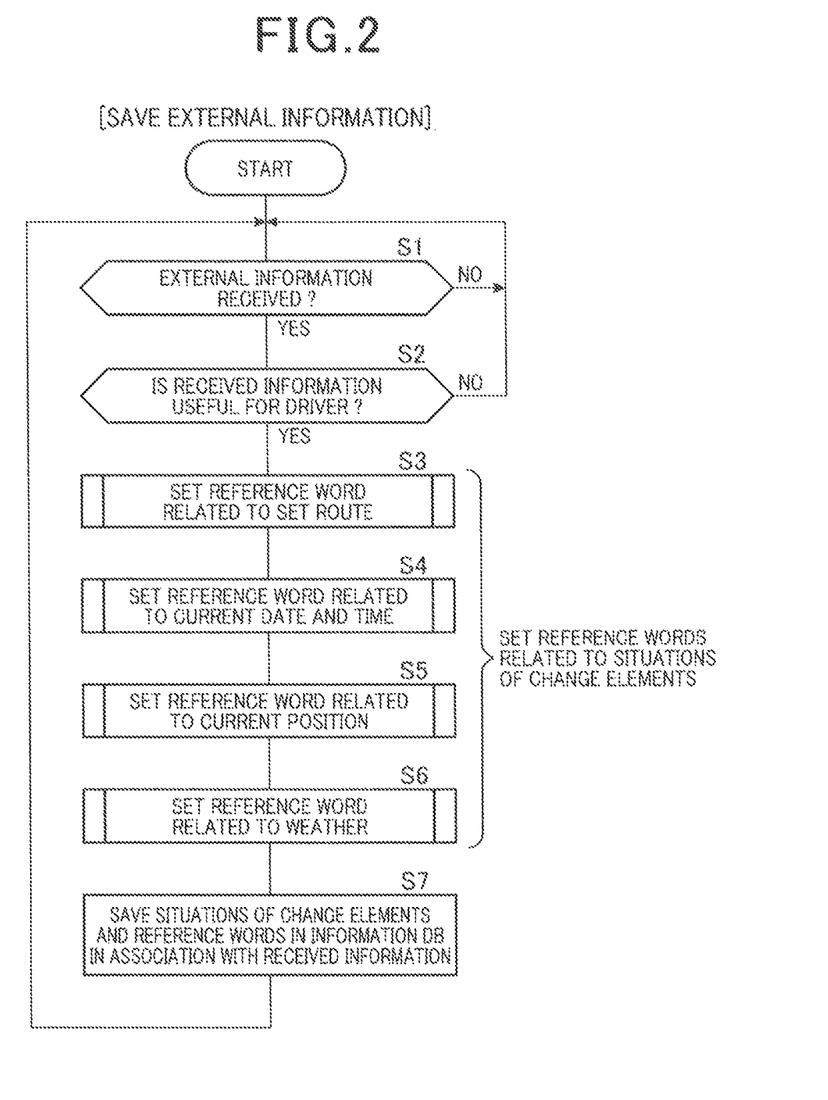
FIG. 2 is a flow chart of a process of receiving and saving external information in an information database.

FIG. 2 is a flow chart of a process of receiving and saving the external information in the information DB. Steps S1 and S2 of FIG. 2 are processes by the information reception unit 11. When the information reception unit 11 receives the external information through the broadcast tuner 30 or the external communication unit 31 in step S1, the information reception unit 11 advances the process to step S2.

In step S2, the information reception unit 11 determines whether the received external information is useful for the driver. For example, the information reception unit 11 determines that the received external information is useful when the content of the received external information is information (such as traffic information and event information) related to the region near the current position of the vehicle. The information reception unit 11 advances the process to step S3 if the received external information is useful for the driver and advances the process to step S1 if the received external information is not useful.

Figure 3:
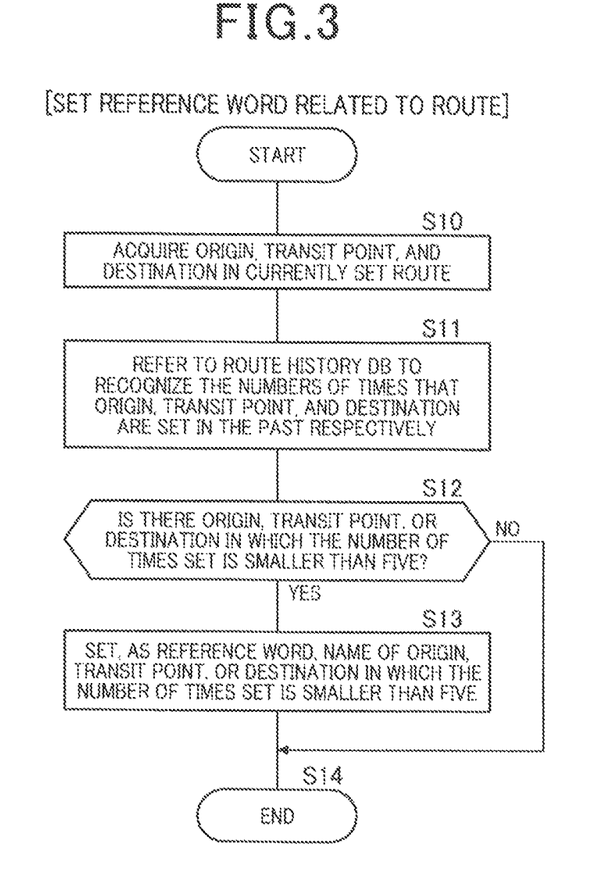
FIG. 3 is a flow chart of a setting process of a reference word related to route setting information.

The following steps S3 to S6 are processes by the situation recognition unit 12 and the external information saving unit 13. In step S3, reference words related to the information on the route set by the route setting unit 17 are set. Note that the process of step S3 is not executed when the route is not set. FIG. 3 is a flow chart of a specific process executed in step S3.

Step S10 of FIG. 3 is a process by the situation recognition unit 12, and the situation recognition unit 12 acquires the origin, the transit point, and the destination in the route set by the route setting unit 17. The following steps S11 to S13 are processes by the external information saving unit 13. In step S11, the external information saving unit 13 refers to a history of routes set in the past saved in the route history DB 42 to recognize the numbers of times that the currently set origin, transit point, and destination are set in the past.

In the next step S12, the external information saving unit 13 determines whether there is a spot in which the number of times set in the past is smaller than five (equivalent to a predetermined number of times of the present invention) among the currently set origin, transit point, and destination. The external information saving unit 13 advances the process to step S13 if there is a spot in which the number of times set in the past is smaller than five and advances the process to step S14 if there is no such a spot. In step S13, the external information saving unit 13 sets, as reference words, the names of the origin, the transit point, and the destination in which the number of times set in the past is smaller than five and advances the process to step S14 (end of process).

Here, the origin, the transit point, and the destination in which the number of times set is smaller than five are likely to be spots set for a trip or an outing, and the driver tends to remember the origin, the transit point, and the destination as information at the reception of the external information. Therefore, it is effective to use the name of the origin, the transit point, or the destination as a reference word.

Figure 4:
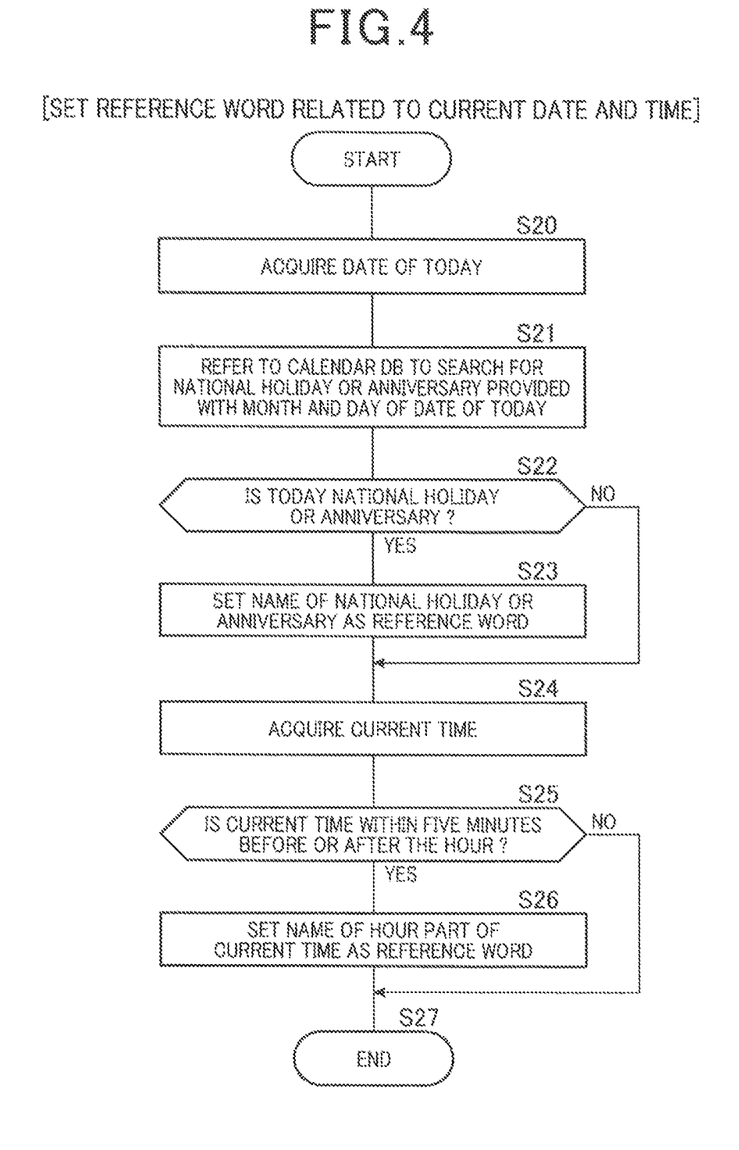
FIG. 4 is a flow chart of a setting process of a reference word related to date and time information.

In step S4 of FIG. 2, a reference word related to the current date and time is set. FIG. 4 is a flow chart of a specific process executed in step S4. Step S20 of FIG. 4 is a process by the situation recognition unit 12, and the situation recognition unit 12 acquires the date of today (current day) counted by a counting unit.

The following steps S21 to S23 are processes by the external information saving unit 13. The external information saving unit 13 refers to information on national holidays or anniversaries (equivalent to specific days of the present invention) saved in the calendar DB 44 to search for a national holiday or an anniversary provided with the month and day of the date of today. Months and days of national holidays designated by law and private anniversaries registered by the user are registered in the calendar DB 44.

In the next step S22, the external information saving unit 13 determines whether today is a national holiday or an anniversary based on the search result in step S21. The external information saving unit 13 advances the process to step S22 if today is a national holiday or an anniversary and advances the process to step S24 if today is not a national holiday or an anniversary. In step S23, the external information saving unit 13 sets the name of the national holiday (for example, Marine Day) or the name of the anniversary (for example, wedding anniversary) as a reference word and advances the process to step S24.

Here, the user is likely to recognize the specific day, and the user tends to remember the specific day as information on the day of the reception of the external information. Therefore, it is effective to use the name of the specific day as a reference word.

Step S24 is a process by the situation recognition unit 12, and the situation recognition unit 12 acquires the current time counted by the timing unit 19. The following steps S25 and S26 are processes by the external information saving unit 13. In step S25, the external information saving unit 13 determines whether the current time is within five minutes before or after the hour (one of 0 o'clock, 1 o'clock, 2 o'clock, . . . , and 23 o'clock) (equivalent to within a predetermined range before or after the hour of the present invention).

The external information saving unit 13 advances the process to step S26 (end of process) if the current time is within five minutes before or after an hour and advances the process to step S27 if the current time is not within five minutes before or after an hour. In step S26, the external information saving unit 13 sets the name of the hour part of the current time (name of the hour) as a reference word and advances the process to step S27 (end of process). For example, when the current time is 12:03, the external information saving unit 13 sets "12 o'clock" as a reference word.

Here, the user often recognizes approximate time by the hour when the user is moving. When the user receives the external information around an hour, the user tends to remember the name of the hour around the time of the reception as information at the reception of the external information. Therefore, it is effective to use the name of the hour as a reference word.

Figure 5:
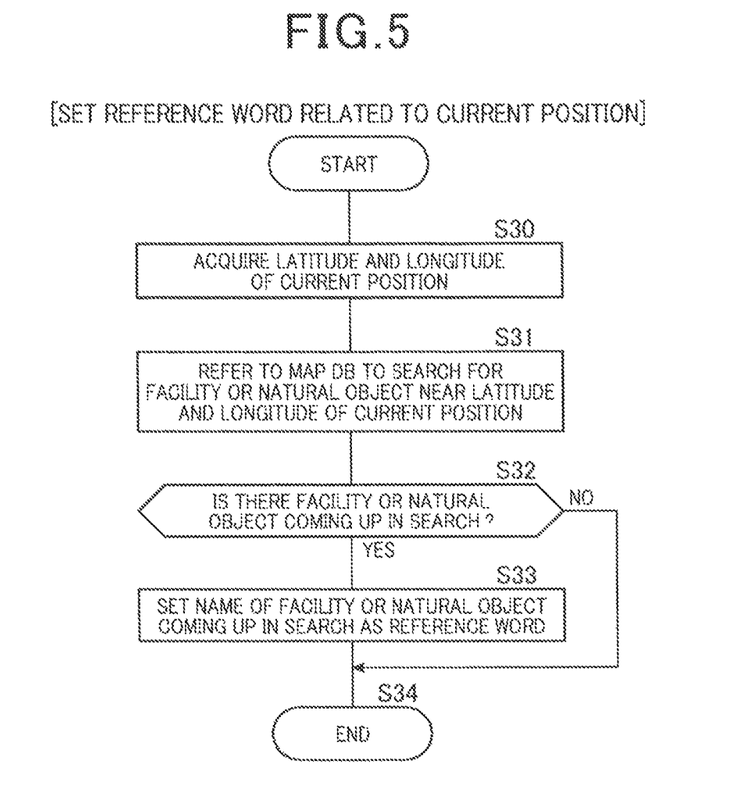
FIG. 5 is a flow chart of a setting process of a reference word related to current position information.

In step S5 of FIG. 2, a reference word related to the current position is set. FIG. 5 is a flow chart of a specific process executed in step S5. Step S30 of FIG. 5 is a process by the situation recognition unit 12, and the situation recognition unit 12 acquires the current position of the information providing apparatus 1 (current position of the vehicle provided with the information providing apparatus 1) detected by the GPS unit 35.

The following steps S31 to S33 are processes by the external information saving unit 13. In S31, the external information saving unit 13 refers to the map data saved in the map DB 43 to search for a facility (such as a building, leisure equipment, and a traffic facility like an intersection) or a natural object (such as a mountain and a river) within a predetermined distance (for example, several km to several dozen km) from the current position.

Note that the user may be able to register in advance the facilities or the natural objects to be searched. Furthermore, the time zone of the search may be limited for a specific facility or natural object. For example, the time zone of the search may be limited to at night for a facility with an improved visibility at night (such as an illuminated building).

In the next step S32, the external information saving unit 13 determines whether there is a facility or a natural object coming up in the search in step S31. The external information saving unit 13 advances the process to step S33 if there is a facility or a natural object coming up in the search and advances the process to step S34 (end of process) if there is no facility or natural object coming up in the search.

In step S33, the external information saving unit 13 sets the name of the facility or the natural object coming up in the search as a reference word and advances the process to step S34 (end of process). Here, the user tends to remember, as information at the reception of the external information, the facilities or the natural objects visually recognized when the user is moving, even if the user is not particularly conscious of the facilities or the natural objects. Therefore, it is effective to use the names of the facilities or the natural objects as reference words.

Figure 6:
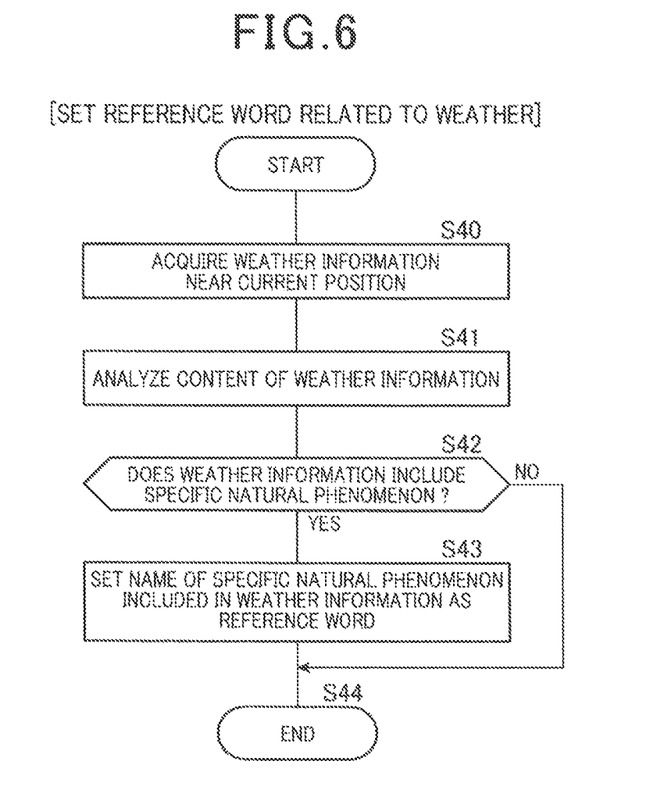
FIG. 6 is a flow chart of a setting process of a reference word related to weather information.

In step S6 of FIG. 2, a reference word related to the current weather is set. FIG. 6 is a flow chart of a specific process executed in step S6. Step S40 of FIG. 6 is a process by the situation recognition unit 12. The situation recognition unit 12 receives weather news from the broadcast tuner 30 or accesses the information transmission server 80 through the external communication unit 31 to acquire weather information to thereby acquire weather information near the current position.

The following steps S41 to S43 are processes by the external information saving unit 13. In step S41, the external information saving unit 13 analyzes the content of the weather information acquired in step S40. In the next step S42, the external information saving unit 13 determines whether the weather information includes information on a specific natural phenomenon, such as a strong wind warning, a heavy snow warning, and an earthquake warning. The external information saving unit 13 advances the process to step S43 if the weather information includes information on a specific natural phenomenon and advances the process to step S44 (end of process) if the weather information does not include information on a specific natural phenomenon.

In step S44, the external information saving unit 13 sets, as a reference word, the name of the specific natural phenomenon (such as heavy rain, strong wind, heavy snow, and earthquake) included in the weather information and advances the process to step S44 (end of process). Here, the user tends to remember, as information at the reception of the external information, an abnormal specific natural phenomenon encountered when the user is moving. Therefore, it is effective to use the name of the specific natural phenomenon as a reference word.

As a result of the processes of steps S3 to S6 of FIG. 2 described above, the external information saving unit 13 sets the reference words related to the situations of the change elements at the time of the reception of the information by the information reception unit 11 in step S1. In the following step 7, the external information saving unit 13 saves, in the information DB 41, the external information received by the information reception unit 11 in step S1, in association with the situations of the change elements recognized by the situation recognition unit 12 in steps S3 to S6 and in association with the reference words set according to the situations of the change elements.

Figure 7:
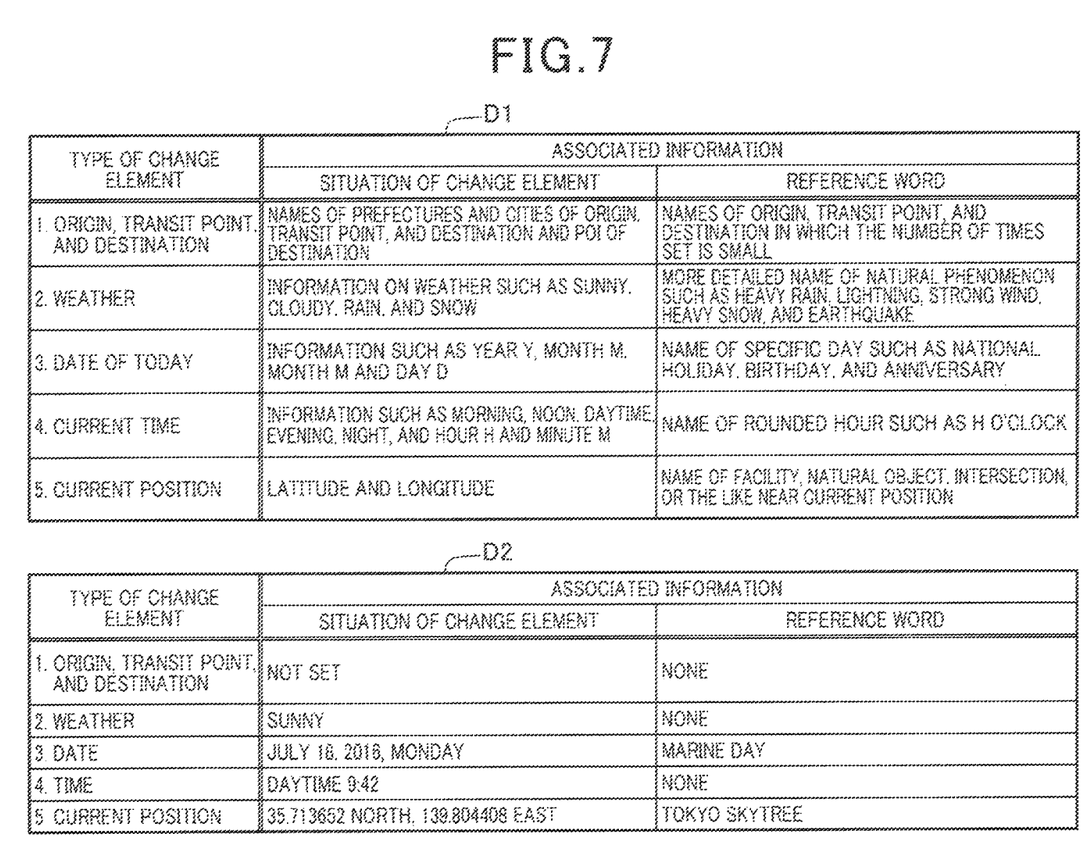
FIG. 7 is an explanatory view of a reference word related to a situation of a change element.

Here, D1 of FIG. 7 is an explanatory view showing setting conditions of the reference words related to the situations of the change elements. Five change elements of "1. Origin, transit point, and destination", "2. Weather", "3. Date of today", "4. Current time", and "5. Current position" are adopted in D1, and the reference words related to the situations of the change elements are set. For example, "Names of prefectures and cities of origin, transit point, and destination and POI (Point Of Interest) of destination" is set as a situation for the change element of "1. Origin, transit point, and destination". "Origin, transit point, and destination in which the number of times set in the past is smaller than a predetermined number of times" is set as a condition of the reference word related to the situation.

D2 of FIG. 7 shows an example of setting the reference words. As for the situations of five change elements of "1. Origin, transit point, and destination", "2. Weather", "3. Date of today", "4. Current time", and "5. Current position" in D2 of FIG. 7, it is recognized that "1. Origin, transit point, and destination" is not set (route is not set). It is recognized that "2. Weather" is "sunny", and there is no information on weather advisory, weather warning, or earthquake. It is also recognized that the situation of "3. Date of today" is "Jul. 18, 2016, Monday", the situation of "4. Current time" is "Daytime 9:42", and the situation of "5. Current position" is "35.713652 north, 139.804408 east".

In the recognized situations of the change elements, "Marine Day" is set as a reference word for the situation "Jul. 18, 2016, Monday" of "3. Date of today". Furthermore, "Tokyo Skytree" as a nearby facility is set as a reference word for the situation "35.713652 north, 139.804408 east" of "5. Current position".

Figure 8:
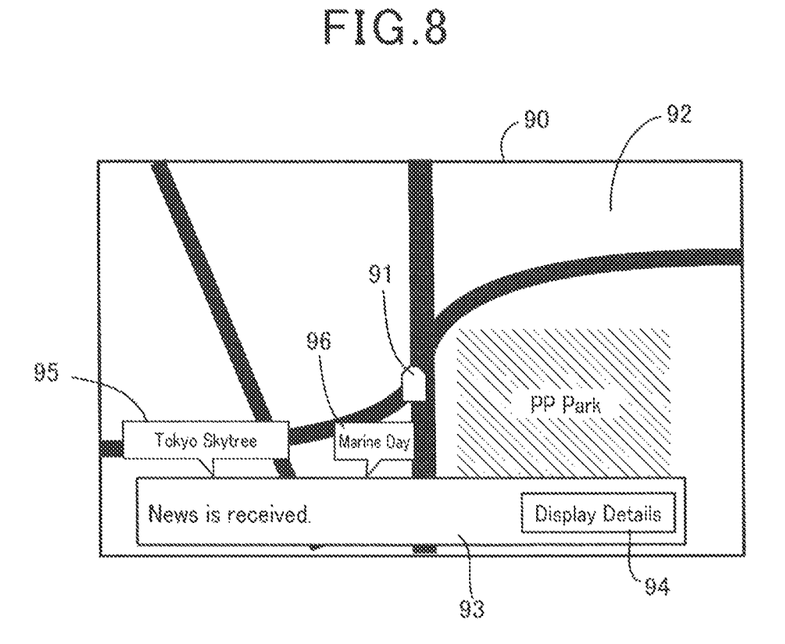
FIG. 8 is an explanatory view of a display screen at the reception of the external information.

FIG. 8 is an explanatory view of a display screen 90 of the display 33b when the information providing apparatus 1 receives the external information. In the situation illustrated in the display screen 90, the control apparatus 10 displays and superimposes a marker 91 indicating the current position of the vehicle on a map image 92 around the current position of the vehicle. When the information reception unit 11 receives external information (news is illustrated in FIG. 8), the control apparatus 10 display a notification image section 93 for notifying the reception of the news.

The control apparatus 10 also displays characters 95 and 96 of "Marine Day" and "Tokyo Skytree" that are reference words set by the external information saving unit 13, according to the situations of the change elements at the reception of the news. The user can visually recognize the characters "Marine Day" and "Tokyo Skytree" to easily remember that the situation at the time of watching the news is "driving near the Tokyo Skytree on the Marine Day".

A detail display button 94 is displayed on the display screen 90, and the control apparatus 10 displays details of the received news on the display screen 90 when a touch operation of the detail display button 94 by the user is recognized from a detection signal of the touch switch 33a.

3. Searching External Information

A process of searching the external information saved in the information DB 41 by the external information saving unit 13 based on the search information input by the user will be described with reference to FIGS. 9 and 10.

Figure 9:
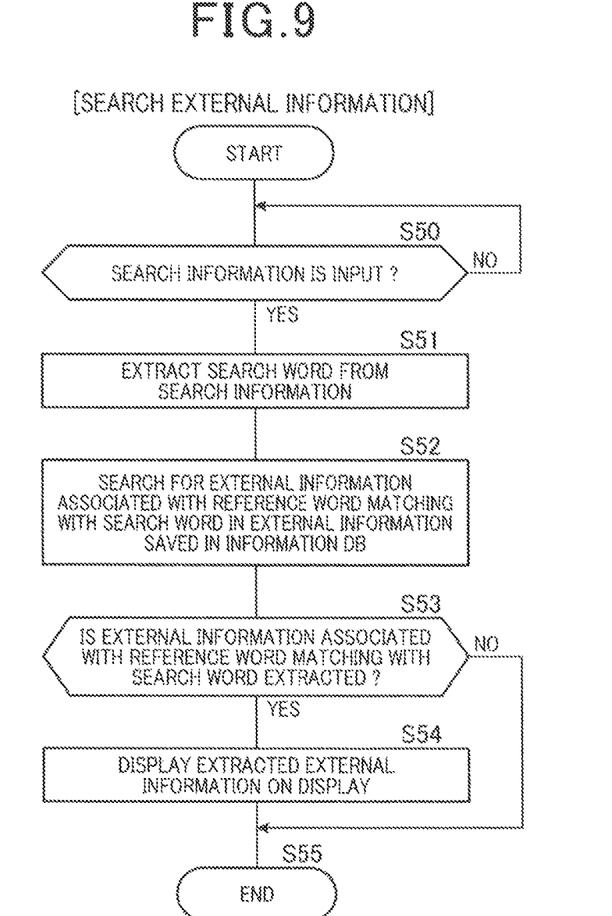
FIG. 9 is a flow chart of a search process of the external information.
Figure 10:
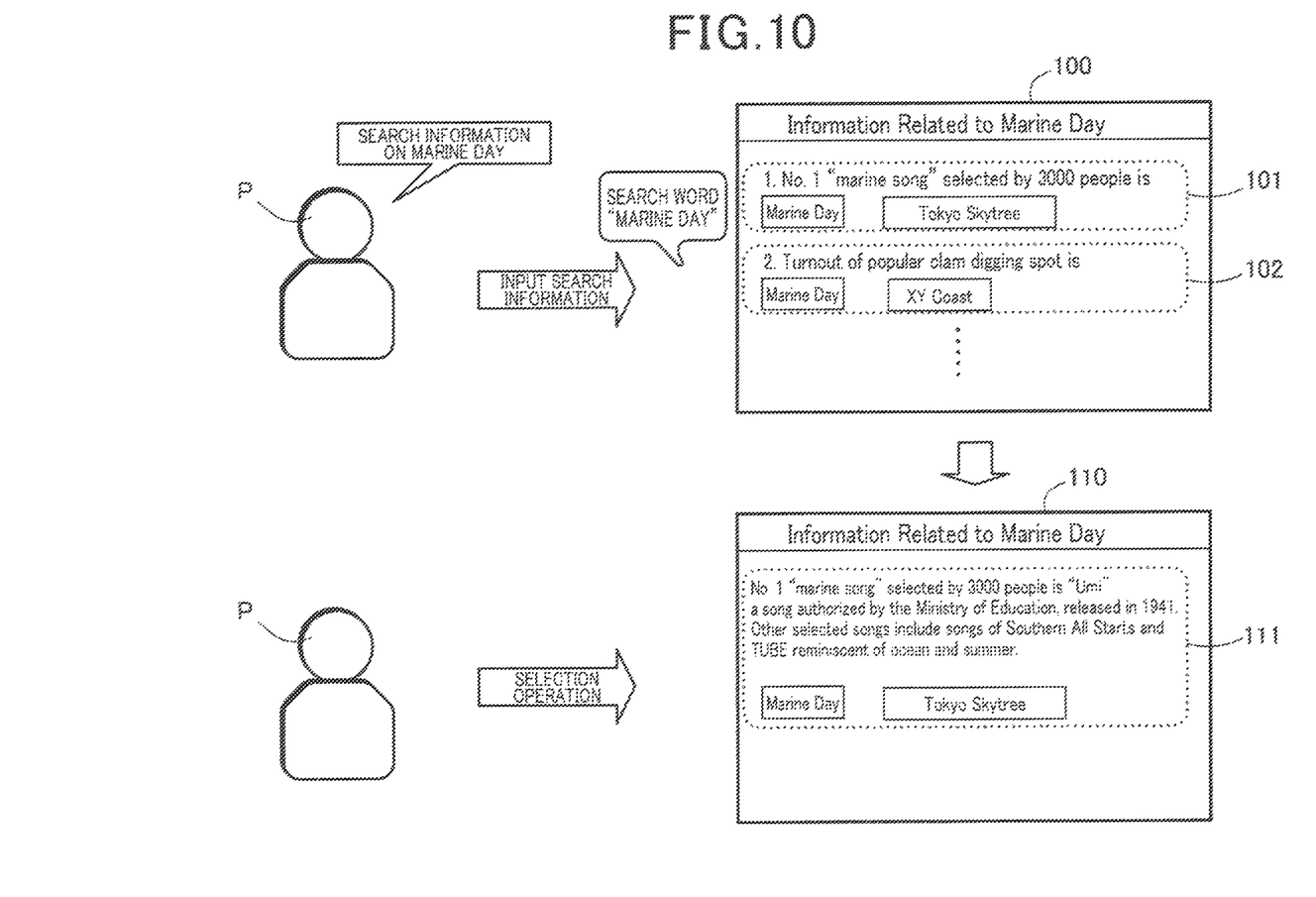
FIG. 10 is an explanatory view of the display screen at the extraction of the external information.

FIG. 9 is a flow chart of a search process of the external information, and the search process is executed by the search reception unit 14, the external information extraction unit 15, and the extracted information output unit 16. The search process of the external information will be described with reference to the flow chart of FIG. 9.

Step S50 of FIG. 9 is a process by the search reception unit 14. The search reception unit 14 receives the input of the search information by the user. In the present embodiment, the search reception unit 14 receives the input of the search information through the voice of the user input to the microphone 34 or through the touch operation of the touch switch 33a by the user.

The following steps S51 and S52 are processes by the external information extraction unit 15. The external information extraction unit 15 extracts a search word from the search information input by the user in step S51. For example, when a user P inputs a voice "search information on the Marine Day", the external information extraction unit 15 extracts the "Marine Day" as a search word in the example illustrated in FIG. 10.

In the next step S52, the external information extraction unit 15 searches and extracts a reference word matching the search word (reference word with a matching rate of 100%) from the reference words saved in the information DB 41. In the example of FIG. 10, external information 101 and external information 102 associated with the search word "Marine Day" as a reference word are extracted. The external information 101 is associated with "Marine Day" and "Tokyo Skytree" as reference words. The external information 102 is associated with "Marine Day" and "XY coast" as reference words.

The following steps S53 to S55 are processes by the extracted information output unit 16. In step S53, the extracted information output unit 16 determines whether external data associated with the reference word matching the search word is extracted by the external information extraction unit 15. The extracted information output unit 16 advances the process to step S54 if external data associated with the reference word matching the search word is extracted and advances the process to step S55 if external data associated with the reference word matching the search word is not extracted.

In step S54, the extracted information output unit 16 displays the external information extracted by the external information extraction unit 15 on the display 33b. The external information 101 and the external information 102 are displayed on a screen display 100 of FIG. 10. The user P can perform a touch operation to select interesting information from the plurality of pieces of external information 101, 102, . . . displayed on the screen display 100 to display detailed information 111 as indicated in a screen 110.

4. Other Embodiments

The embodiment of the present invention is not limited to the example described above, and changes and applications can be appropriately made within the scope of the present invention.

In the embodiment, the external information saving unit 13 in the control apparatus 10 included in the information providing apparatus 1 sets the reference words related to the situations of the change elements at the time of the reception of the external information and associates and saves the external information and the reference words in the information DB 41. However, the external support server 60 may execute the process of associating the external information with the reference words as shown in FIG. 1.

In this case, the control apparatus 10 of the information providing apparatus 1 includes the first transmission unit 20 that transmits, to the support server 60, acquired information data indicating the external information and the situations of the change elements at the time of the reception of the external information. The support server 60 includes the CPU and the memory as described above and the CPU executes a control program of the support server 60 held in the memory to function as a second reception unit 64 that receives the acquired information data transmitted from the information providing apparatus 1, a reference information data generation unit 61 that sets reference words related to the situations of the change elements indicated by the acquired information data and that generates reference information data indicating the external information and the reference words, and a second transmission unit 63 that transmits the reference information data to the information providing apparatus 1.

The control apparatus 10 of the information providing apparatus 1 includes the first reception unit 21 that receives the reference information data transmitted from the support server 60, and the external information saving unit 13 associates and saves, in the information DB 41, the external information and the reference words indicated by the reference information data. In this case, the support server 60 is equivalent to a server of the present invention.

Figure 1:
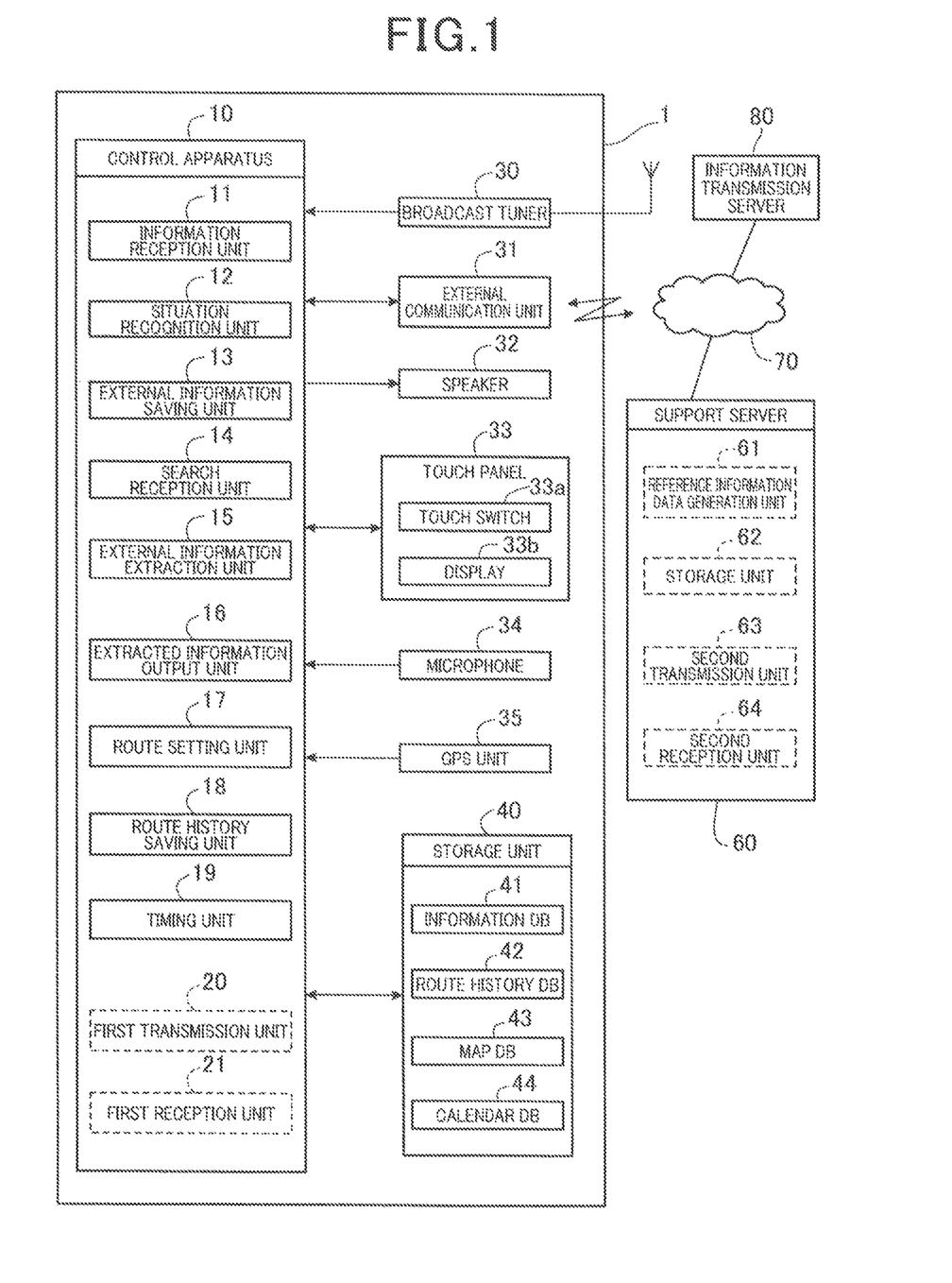
FIG. 1 is a block diagram of an information providing apparatus and a server.

Although the information providing apparatus 1 includes the storage unit 40 in the embodiment as shown in FIG. 1, the support server 60 may include a storage unit 62, and all or part of the information DB 41, the route history DB, the map DB 43, and the calendar DB 44 may be included in the storage unit 62. In this case, the control apparatus 10 accesses the storage unit of the support server through the external communication unit 31 to transfer information data.

Although the information providing apparatus 1 is part of the functions of the vehicle-mounted device installed on the vehicle in the embodiment, the information providing apparatus 1 may be part of functions of a communication terminal, such as a portable navigation apparatus and a smartphone, carried and used in the vehicle.

Although the external information saving unit 13 searches for facilities and natural objects within a predetermined distance from the current position of the information providing apparatus 1 in step S31 of FIG. 5 in the embodiment, the setting of the predetermined distance may be changed according to the facilities or the natural objects. For example, the predetermined distance may be set to a long distance for high mountains that can be visually recognized from a distance. Furthermore, the name of the current position may be set as a reference word. For example, AA street or a traffic circle of BB station may be set as a reference word.

Although the external information extraction unit 15 searches for the external information associated with the reference word matching the search word (perfect matching, matching rate of 100%) in step S52 of FIG. 9 in the embodiment, the external information extraction unit 15 may search for external information associated with a reference word with a matching rate equal to or higher than a predetermined level, instead of perfect matching.

Although the moving body of the present invention is a vehicle in the embodiment, the present invention can also be applied when the user carries a portable information providing apparatus and moves on foot, and the user is the moving body in this case.

Note that FIG. 1 is a schematic diagram in which the functional components of the information providing apparatus 1 are sorted according to details of main processes in order to facilitate the understanding of the present invention, and the components of the information providing apparatus 1 can also be sorted into a larger number of constituent elements according to the details of the processes. The components can also be sorted such that one constituent element executes more processes. The process by each constituent element may be executed by one piece of hardware or may be executed by a plurality of pieces of hardware. The process by each constituent element may be realized by one program or may be realized by a plurality of programs.

In the control apparatus 10 shown in FIG. 1, the program executed by the CPU may be downloaded from, for example, an external server through the external communication unit 31 and the network 70, and the program may then be loaded on the memory, such as a RAM, and executed by the CPU. The program may also be directly loaded on the memory, such as a RAM, from the external server through the external communication unit 31 and the network 70 and executed by the CPU. Alternatively, the program may be loaded on the memory, such as a RAM, from a storage medium connected to the information providing apparatus 1.

The processes of the flow charts shown in FIGS. 2 to 6 and 9 are divided according to the details of main processes in order to facilitate the understanding of the processes by the control apparatus 10. The present invention is not limited by the diving method or the names of the processes. The processes by the control apparatus 10 may also be divided into more processes according to the details of the processes. The processes can also be divided such that one process includes more processes. The order of processing in each flow chart is not limited to the illustrated example as long as similar processing results can be obtained.

REFERENCE SIGNS LIST

1 Information providing apparatus
10 Control apparatus
11 Information reception unit
12 Situation recognition unit
13 External information saving unit
14 Search reception unit
15 External information extraction unit
16 Extracted information output unit
17 Route setting unit
18 Route history saving unit
19 Timing unit
20 First transmission unit
21 First reception unit
30 Broadcast tuner
31 External communication unit
32 Speaker
33 Touch panel
34 Microphone
35 GPS unit
40 Storage unit
41 Information DB
42 Route history DB
43 Map DB
44 Calendar DB
60 Support server (server)
61 Reference information data generation unit
62 Storage unit
63 Second transmission unit
64 Second reception unit

What is claimed is:

1. An information providing apparatus used in a moving body, the information providing apparatus comprising:
a control apparatus including a CPU which controls overall operation of circuits; and
a memory including an information database and a route history database,
wherein the control apparatus includes:
an information reception circuit that receives external information;
a situation recognition circuit that recognizes a situation of a predetermined change element;
an information output circuit that outputs information;
an external information saving circuit that sets a reference word related to the situation of the change element and that associates and saves the received external information and the set reference word in the information database of the memory after the recognition of the situation of the change element by the situation recognition unit at the reception of the external information when the information reception circuit receives the external information;
a search reception circuit that receives input of search information by a user;
an external information extraction circuit that extracts a search word from the search information and that extracts the external information associated with the reference word, in which a matching rate with the search word is equal to or greater than a predetermined level, from the external information saved in the information database of the memory when the search reception circuit receives the input of the search information by the user;
an extracted information output circuit that outputs the external information extracted by the external information extraction circuit from the information output circuit;
a route setting circuit that sets a route of the moving body from an origin to a destination; and
a route history saving circuit that saves a past history of routes set by the route setting circuit in the route history database of the memory, wherein
the change element is an origin, a transit point, or a destination in a route set by the route setting circuit, the situation recognition circuit recognizes the origin, the transit point, or the destination, and
the external information saving circuit sets, as the reference word, a name of a spot, in which the number of times set in the past by the route setting circuit is smaller than a predetermined number of times, when the external information saving circuit recognizes the spot among the origin, the transit point, and the destination recognized by the situation recognition circuit from the history of routes saved in the route history database.

2. The information providing apparatus according to claim 1, wherein
the change element includes a current position of the moving body, the situation recognition circuit recognizes the current position of the moving body, and
the external information saving circuit sets, as the reference word, a name of the current position of the moving body recognized by the situation recognition circuit or a name of a facility or a natural object within a predetermined distance from the current position.

3. The information providing apparatus according to claim 2, wherein
the external information saving circuit changes setting of the predetermined distance according to the facility or the natural object.

4. The information providing apparatus according to claim 1, wherein
the change element includes weather of a region of a location of the moving body, the situation recognition circuit recognizes weather information on the region, and
the external information saving circuit sets a name of a specific natural phenomenon as the reference word when the weather information recognized by the situation recognition circuit includes the specific natural phenomenon.

5. The information providing apparatus according to claim 1, wherein
the change element includes month and day of a current date, the situation recognition circuit recognizes the month and day of the current date, and
the external information saving circuit sets a name of a specific day as the reference word when the month and day of the current date recognized by the situation recognition circuit is the specific day.

6. The information providing apparatus according to claim 1, wherein
the change element includes current time, the situation recognition circuit recognizes the current time, and
the external information saving circuit sets a name of an hour as the reference word when the current time recognized by the situation recognition circuit is within a predetermined range before or after the hour.

7. An information providing method comprising the steps of:
an information reception circuit controlled by a CPU receiving external information;
a situation recognition circuit controlled by the CPU recognizing a situation of a predetermined change element at the reception of the external information when the information reception circuit receives the external information;
an external information saving circuit controlled by the CPU setting a reference word related to the situation of the change element recognized by the situation recognition circuit and associating and saving the external information and the set reference word in an information database of a memory;
a search reception circuit controlled by the CPU receiving input of search information by a user;
an external information extraction circuit controlled by the CPU extracting a search word from the search information and extracting the external information associated with the reference word, in which a matching rate with the search word is equal to or greater than a predetermined level, from the external information saved in the information database when the search reception circuit receives the input of the search information by the user;
an extracted information output circuit controlled by the CPU outputting the external information extracted by the external information extraction unit from an information output circuit;
a route setting circuit controlled by the CPU setting a route of the moving body from an origin to a destination; and
a route history saving circuit controlled by the CPU saving a past history of routes set by the route setting circuit in a route history database of the memory, wherein
the change element is an origin, a transit point, or a destination in a route set by the route setting circuit, the situation recognition circuit recognizes the origin, the transit point, or the destination, and
the external information saving circuit sets, as the reference word, a name of a spot, in which the number of times set in the past by the route setting circuit is smaller than a predetermined number of times, when the external information saving circuit recognizes the spot among the origin, the transit point, and the destination recognized by the situation recognition circuit from the history of routes saved in the route history database.

8. The information providing method according to claim 7, wherein
the change element includes a current position of the moving body, the situation recognition circuit recognizes the current position of the moving body, and
the external information saving circuit sets, as the reference word, a name of the current position of the moving body recognized by the situation recognition circuit or a name of a facility or a natural object within a predetermined distance from the current position.

9. The information providing method according to claim 8, wherein
the external information saving circuit changes setting of the predetermined distance according to the facility or the natural object.

10. The information providing method according to claim 7, wherein
the change element includes weather of a region of a location of the moving body, the situation recognition circuit recognizes weather information on the region, and
the external information saving circuit sets a name of a specific natural phenomenon as the reference word when the weather information recognized by the situation recognition circuit includes the specific natural phenomenon.

11. The information providing method according to claim 7, wherein
the change element includes month and day of a current date, the situation recognition circuit recognizes the month and day of the current date, and
the external information saving circuit sets a name of a specific day as the reference word when the month and day of the current date recognized by the situation recognition circuit is the specific day.

12. The information providing method according to claim 7, wherein
the change element includes current time, the situation recognition circuit recognizes the current time, and
the external information saving circuit sets a name of an hour as the reference word when the current time recognized by the situation recognition circuit is within a predetermined range before or after the hour.

* * * * *